(12) United States Patent
Mathew et al.

(10) Patent No.: US 12,554,595 B2
(45) Date of Patent: Feb. 17, 2026

(54) HANDLING DISTRIBUTED TRANSACTIONS

(71) Applicant: Dell Products L.P., Round Rock, TX (US)

(72) Inventors: George Mathew, Belmont, CA (US); Shashikanth Lakshmikantha, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 43 days.

(21) Appl. No.: 18/410,737

(22) Filed: Jan. 11, 2024

(65) Prior Publication Data

US 2025/0231842 A1 Jul. 17, 2025

(51) Int. Cl.
*G06F 11/14* (2006.01)
*G06F 11/1446* (2026.01)
*G06F 16/22* (2019.01)

(52) U.S. Cl.
CPC ...... *G06F 11/1469* (2013.01); *G06F 11/1464* (2013.01); *G06F 16/2246* (2019.01); *G06F 2201/80* (2013.01)

(58) Field of Classification Search
CPC ............. G06F 11/1469; G06F 16/2246; G06F 11/1464; G06F 2201/80
See application file for complete search history.

(56) References Cited

U.S. PATENT DOCUMENTS

| 6,859,811 B1* | 2/2005 | Chandrasekaran ........................ G06F 11/2069 |
| 2011/0225164 A1* | 9/2011 | Narasayya .......... G06F 16/2282 707/E17.037 |
| 2019/0012244 A1* | 1/2019 | Amirishetty ........ G06F 16/2336 |
| 2024/0111726 A1* | 4/2024 | Lakshmikantha .. G06F 16/1734 |

* cited by examiner

*Primary Examiner* — Bryce P Bonzo
*Assistant Examiner* — Audrey Emma Whitesell
(74) *Attorney, Agent, or Firm* — Staniford Tomita LLP

(57) ABSTRACT

Cluster nodes are allowed to start transactions involving modifications to multiple entities by locking a current entity for a current modification associated with a transaction, but not locking a subsequent entity for a subsequent modification associated with the same transaction. Undo log records are generated to allow the modifications to be rolled back. When a lock being held by a first node for a first transaction involving a modification made to an entity is requested by a second node for a second transaction involving the same entity, an undo record is persisted to a log to allow the modification to be rolled back, the lock being held by the first node is revoked and provided to the second node. Upon a determination that the first node has crashed before the first transaction could be committed, the log is replayed to undo the modification made by the first node.

16 Claims, 11 Drawing Sheets

HANDLING DISTRIBUTED TRANSACTIONS

TECHNICAL FIELD

The present invention relates generally to information processing systems, and more particularly to handling distributed transactions in large-scale distributed filesystems.

BACKGROUND

Filesystems provide a way to organize data stored in a storage system and present that data to clients or client applications. During transactions on the filesystem, there is a need to coordinate access to shared resources to ensure data consistency and integrity. Conflicts may arise when multiple nodes or clients attempt to access or modify the same resource concurrently.

Current techniques of coordination for distributed transactions are inefficient and negatively impact the performance of the filesystem. There is a need for improved systems and techniques for handling distributed transactions.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY

Cluster nodes are allowed to start transactions involving modifications to multiple entities by locking a current entity for a current modification associated with a transaction, but not locking a subsequent entity for a subsequent modification associated with the same transaction. Undo log records are generated to allow the modifications to be rolled back. When a lock being held by a first node for a first transaction involving a modification made to an entity is requested by a second node for a second transaction involving the same entity, an undo record is persisted to a log to allow the modification to be rolled back, the lock being held by the first node is revoked and provided to the second node. Upon a determination that the first node has crashed before the first transaction could be committed, the log is replayed to undo the modification made by the first node.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
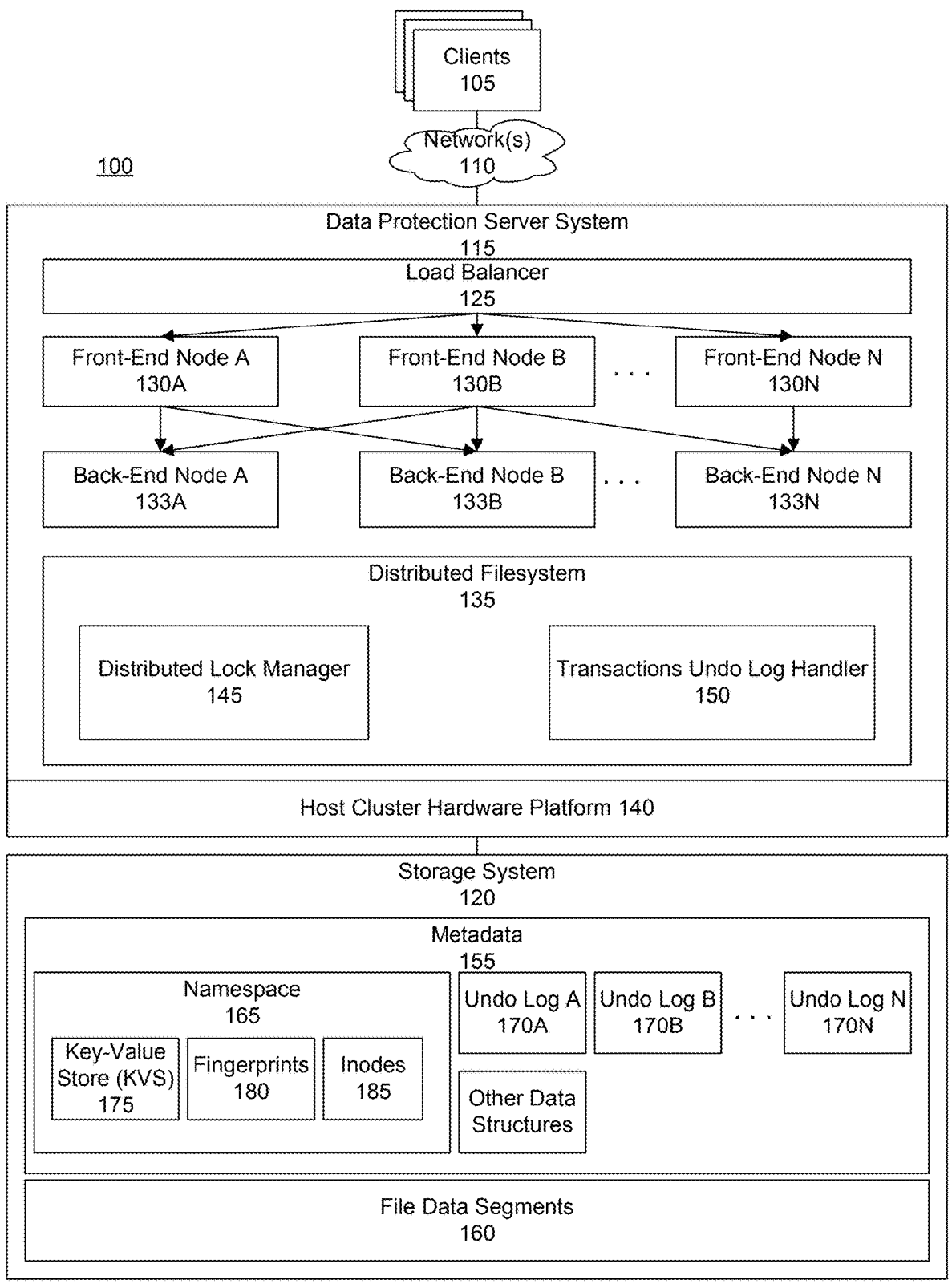
FIG. 1 shows a block diagram of an information processing system for handling distributed transactions, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two. It should be appreciated that the blocks, components, and modules shown in the figures may be functional and there can be many different hardware configurations, software configurations, or both to implement the functions described.

FIG. 1 shows a block diagram of an information processing system 100 within which methods and systems for handling distributed transactions with undo logs may be implemented. A distributed transaction is a type of transaction that may involve or span multiple nodes, entities, or processes. In order to maintain consistency and integrity of the data, it is desirable that a series of operations that may be involved in a distributed transaction be treated as a single, atomic unit.

The example shown in FIG. 1 includes a set of clients 105 connected via a network 110 to a data protection server system 115 which, in turn, is connected to a storage system 120. The data protection system includes a load balancer 125, a cluster of nodes including front-end nodes 130A-N and back-end nodes 133A-N, a distributed filesystem 135, and is supported by an underlying host hardware platform 140. Components of the filesystem include a distributed lock manager (DLM) 145 and a transactions undo log handler 150.

Storage includes metadata 155 and file data segments 160. Storage may include an object store or object storage. The metadata includes a namespace 165 and undo logs 170A-N. The namespace includes a key-value store (KVS) 175, fingerprints 180, and inodes 185.

In an embodiment, the filesystem operates across a cluster of nodes and provides a way to organize data stored in the storage system and present that data to clients and applications in a logical format. The filesystem organizes the data into files and folders into which the files may be stored. When a client requests access to a file, the filesystem issues a file handle or other identifier for the file to the client. The client can use the file handle or other identifier in subsequent operations involving the file. A namespace of the filesystem provides a hierarchical organizational structure for identifying filesystem objects through a file path. A file can be identified by its path through a structure of folders and subfolders in the file system. A filesystem may hold many hundreds of thousands or even many millions of files across many different folders and subfolders and spanning thousands of terabytes.

In a distributed multi-node cluster, shared namespace metadata can be updated by filesystem processes running on multiple nodes. One way of guaranteeing mutual exclusion is by using a distributed lock manager and locking the entire hierarchy of the metadata chain. Guaranteeing crash safe metadata updates may be implemented via transactions by logging the metadata updates to a persistent replay log before making the metadata updates. On a crash, the transactions logged in the replay log is replayed to restore sanity to the filesystem. In an embodiment, systems and techniques allow distributed namespace metadata updates via transactions with partial locking of the namespace hierarchy by using the replay log as an accomplice. The advantage of partial locking includes avoiding having to freeze the entire metadata by taking the entire hierarchy of locks.

More particularly, the lock manager is responsible for managing locks on entities of the namespace to prevent conflicts that may arise when multiple nodes attempt to access or modify the same entity concurrently. The lock manager enforces concurrency control by allowing or denying access to a shared resource (e.g., namespace entity) based on the current lock status. The lock manager is responsible for issuing locks to the nodes and revoking the locks from the nodes. There can be read locks that permit multiple nodes to access a resource concurrently for reading. There can be write locks that ensure exclusive access for write operations. Locks may be defined at varying levels of granularity throughout the namespace and entities in the namespace.

The transactions undo log handler is responsible for generating undo records for operations associated with atomic transactions involving the namespace entities and recording them, as needed, in an undo log. The undo record of an operation includes information that allows the operation involving the namespace entity to be reversed or rolled back to a previous state before the operation. For example, the undo record may include old or original values that were modified during the operation, pointers or references to the locations of modified data, pointers or references to the locations of old, previous, or original data, transaction identifier, timestamp indicating when the change occurred, operation type, namespace entity identifier, other information, or combinations of these. In an embodiment, an undo log is maintained for each node in the cluster. An undo log may be referred to as a replay log.

In an embodiment, the filesystem is a deduplicated filesystem. A deduplicated filesystem is a type of filesystem that can reduce the amount of redundant data that is stored. In a deduplication-based system, data such as files to be backed up are divided into a set of segments. The segments are hashed to generate a set of fingerprints. These fingerprints uniquely identify the segments. The data protection system maintains metadata separate from the actual client data being backed up. The metadata includes a collection of fingerprints corresponding to data segments that already exist on the backup storage system. If the fingerprint of a data segment from a file to be backed up does not match an existing fingerprint, the data segment is written to the physical disk storage of the storage system and the fingerprint is added to the collection of existing fingerprints. If, however, the fingerprint matches an existing fingerprint, the data segment is determined to be a duplicate and is not written to the storage system. Instead, a reference is generated that points to the already existing data segment on backup storage that corresponds to the fingerprint. The reference is stored as metadata by the data protection backup system so that the file can be reconstructed or reassembled as part of a restore operation.

Figure 2:
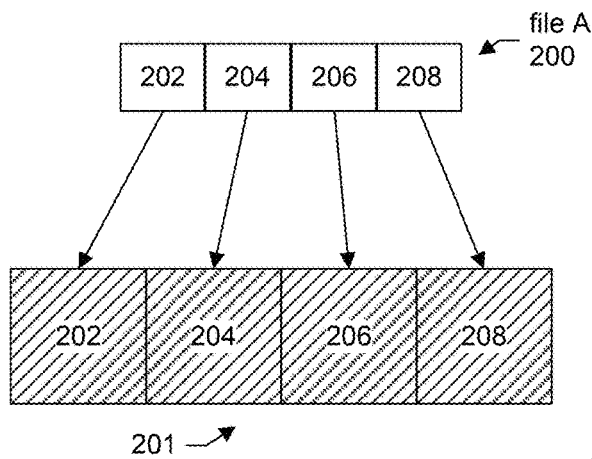
FIG. 2 shows an example of a deduplication process of a filesystem in a first state, according to one or more embodiments.
Figure 3:
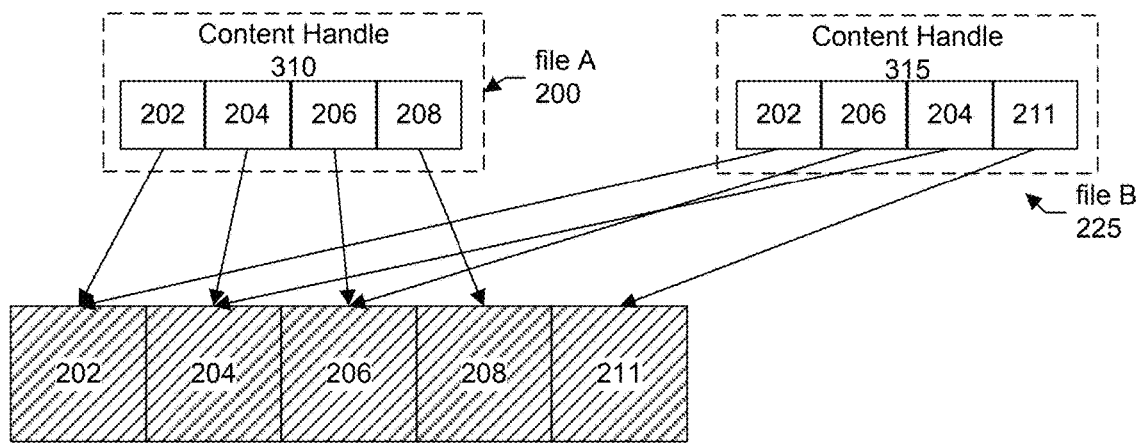
FIG. 3 shows an example of the deduplication process of the filesystem in a second state, according to one or more embodiments.
Figure 4:
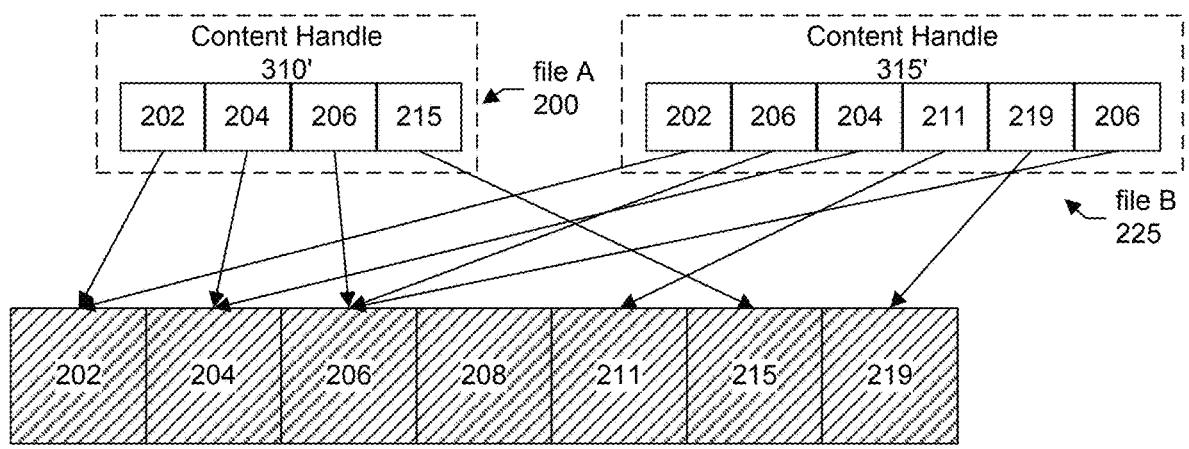
FIG. 4 shows an example of the deduplication process of the filesystem in a third state, according to one or more embodiments.

More particularly, FIGS. 2-4 show block diagrams illustrating a deduplication process of the filesystem according to one or more embodiments. FIG. 2 shows an example of the filesystem in a first state. As data, such as an incoming client user file A 200 enters the filesystem, it is segmented into data segments 201. Identifiers are calculated for the segments. In an embodiment, the identifiers include fingerprints. A cryptographic hash function (e.g., Secure Hash Algorithm 1 (SHA1)) is applied to the segments to calculate the fingerprints (e.g., SHA1 hash values) for each of the data segments making up the incoming file. In the example shown in FIG. 2, the fingerprints are 202, 204, 206, and 208. A fill pattern indicates the data segments corresponding to the fingerprints.

FIG. 3 shows an example of the filesystem in a second state, after the first state. A client user file B 225 has likewise been segmented into data segments. Fingerprints (202, 206, 204, and 211) have been calculated for each of the segments and filtered against existing segments to remove duplicates (e.g., duplicate segments 202, 206, and 204). New or non-redundant segments (e.g., 211) are stored. Thus, a segment not having matching fingerprints may be stored. A segment that happens to be the same as another segment (based on having matching fingerprints) may not be again stored. This helps to eliminate redundant data and conserve storage space.

Metadata, however, is generated and stored that allows the filesystem to reconstruct or reassemble the file using the already stored or previously stored and existing segments. Since the files share some identical segments, referencing the segments using the fingerprints allows a single instance of a particular segment to be stored, thus reducing redundant or duplicate data. The fingerprints or identifiers referencing the segments are substantially less in size that the actual data segments themselves.

FIG. 4 shows an example of the filesystem in a third state, after the first and second states. In this example, the files have been modified such that file A references segment 215 instead of 208. File B references a new segment 219 in addition to segments 202, 206, 204, and 211, and has an additional reference to segment 206.

Each file is associated with a content handle (CH) that represents data content of a file at a particular point-in-time. A content handle of a file may be generated based on an ordered collection of fingerprints corresponding to data segments making up the file. For example, referring back now to a state of the filesystem as shown in FIG. 3, file A has a content handle 310 based on fingerprints 202, 204, 206, and 208. File B has a content handle 315 based on fingerprints 202, 206, 204, and 211. In the example of FIG. 4, however, the content handles for files A and B are now 310' and 315', respectively, to indicate that they have changed based on their modifications. In other words, content handle 310 is different from content handle 310'; and content handle 315 is different from content handle 315'. A content handle may be viewed as a compact snapshot of a file's data contents. The content handle of a file thus encodes content of the file into a name of the file.

Figure 5:
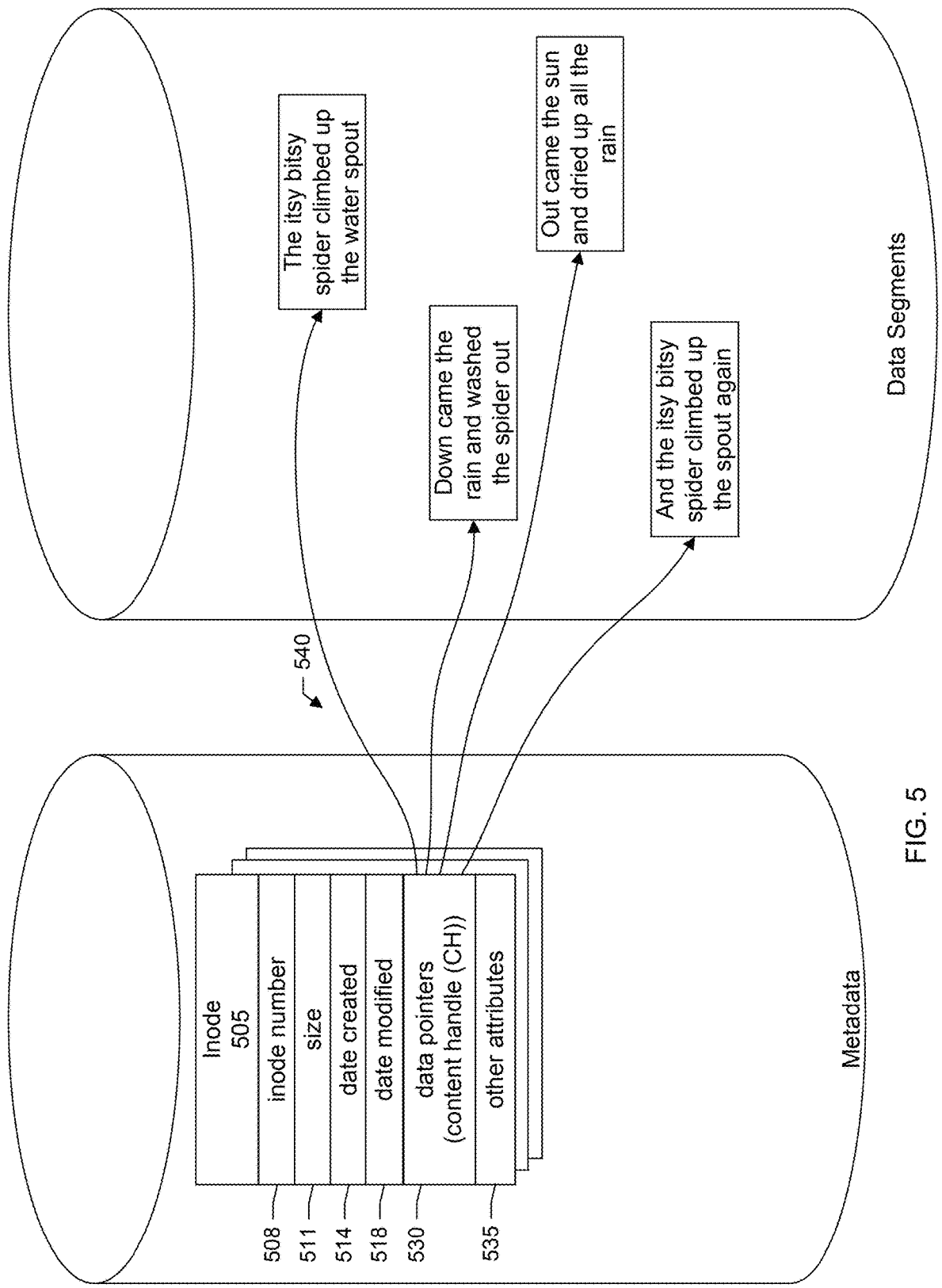
FIG. 5 shows a block diagram of an inode, according to one or more embodiments.

Referring back now to FIG. 1, the data protection system maintains, in addition to data segments of making up client files, other data or metadata to facilitate organization, search, point-in-time recoveries, and so forth. An inode is a type of data structure that may be stored by the filesystem. In an embodiment, each file in the filesystem is associated with an inode. The inode associated with a file stores metadata about the file. FIG. 5 shows a block diagram of an inode 505. The inode includes an inode number 508. The inode number uniquely identifies the inode from among other inodes in the filesystem. Other attributes of the inode may include a size 511 indicating a size of a file associated with the inode, date created 514 indicating a time and date the file was created, date modified 518 indicating a time and date the file was last modified, a set of data pointers 530, and other attributes 535 (e.g., file owner, file permissions, and so forth). The data pointers store location information or addresses mapping 540 the inode to the actual data.

Figure 6:
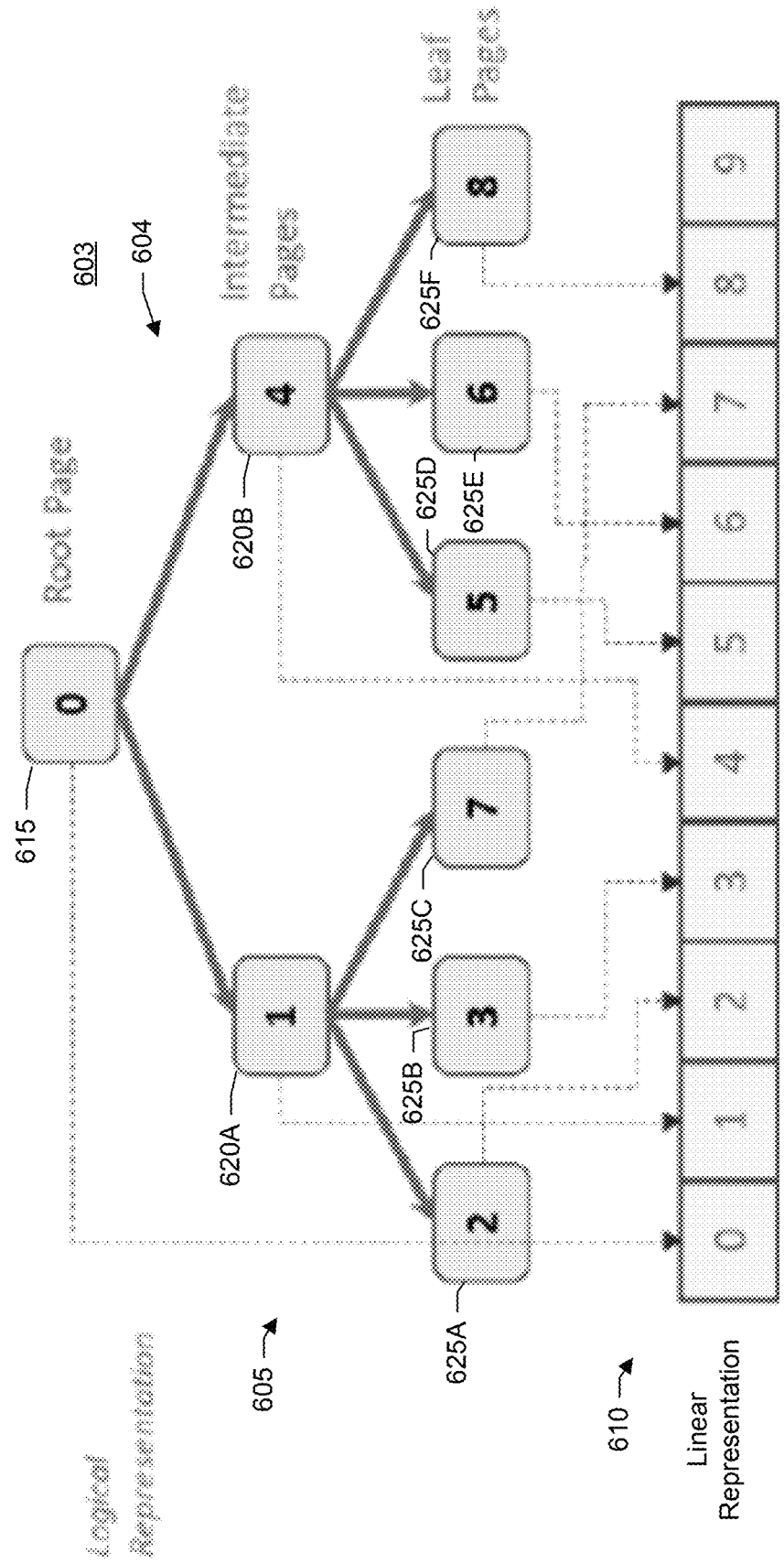
FIG. 6 shows a block diagram of a B+ Tree, according to one or more embodiments.

Referring back now to FIG. 1, the namespace component of the filesystem maintains filesystem metadata such as the names of files and directories (or folders). The namespace provides a hierarchical view of the named directories files, and their associated attributes. In an embodiment, a tree data structure and, more specifically, a B+ tree is used to maintain this filesystem metadata. FIG. 6 shows an example of a data structure 603 holding a namespace. The data structure includes a set of entities 604 organized into a hierarchical arrangement. In an embodiment, the data structure is a B+ Tree.

FIG. 6 shows an example of the B+ Tree in a logical representation 605 and a linear representation 610. In this example, the entities include a root page 615, intermediate pages 620A,B, and leaf pages 625A-F. The broken lines shown in FIG. 6 map the pages from their logical representation in the tree to their representation as a linear sequential set of pages on disk, e.g., flattened on-disk layout. In other words, the tree may be represented as a line of pages of data.

In an embodiment, there is a filesystem namespace which contains file metadata and is implemented as a B+ tree. An example of a filesystem using such a tree data structure is the Data Domain File System (DDFS) as provided by Dell, Inc. of Round Rock, Texas. While some embodiments are described in conjunction with the Data Domain Filesystem, it should be appreciated that aspects and principles of the systems and techniques described herein can be applied to many other filesystems.

A B+ tree is a balanced tree of fixed depth, where interior nodes or entities contain pointers to leaf pages, and leaf pages contain metadata on how to get to all the files in the namespace. Before using a file for read or write, the file location is retrieved from the metadata stored in the leaf pages of the B+ tree.

Figure 7:
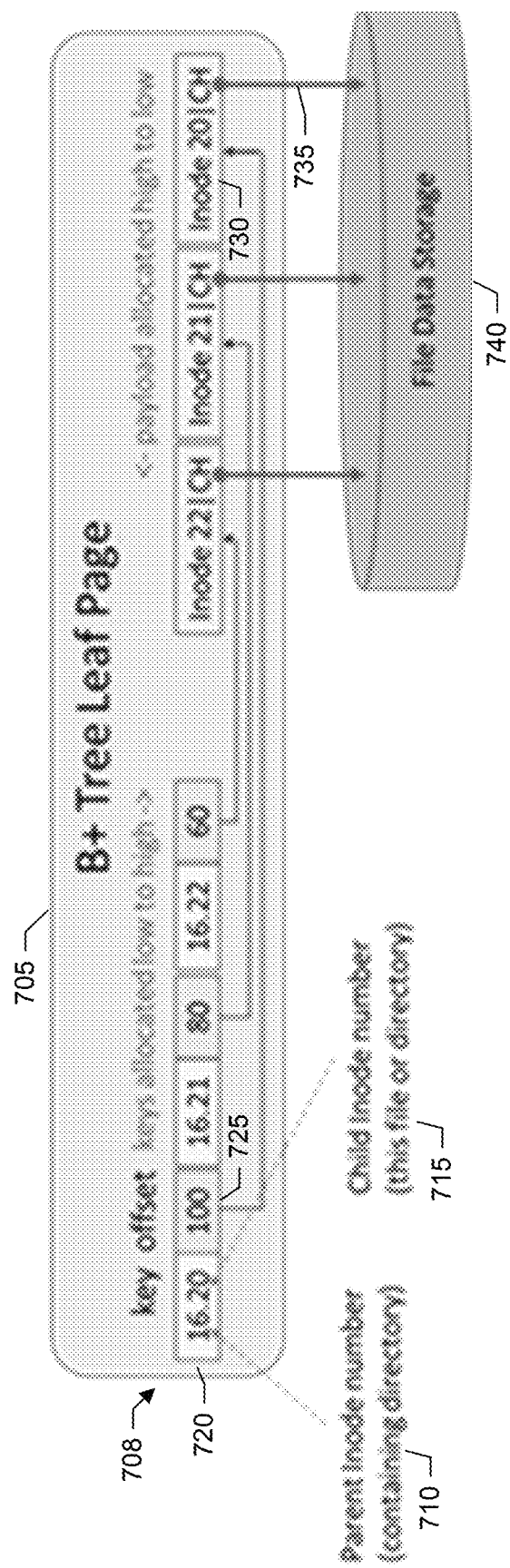
FIG. 7 shows an example of a B+ Tree leaf page, according to one or more embodiments.

FIG. 7 shows an example of a B+ tree leaf page layout. B+ tree leaf pages store file metadata. Specifically, in a leaf page or lowest page 705 in the B+ tree file or directory information is stored as key/value pairs 708, where the key is of the format (parent-ID: Child-ID). That is, a parent-ID 710 represents the ID of the directory that the file is in, and a Child-ID 715 represents the file ID itself. The value field is additional information relating to the metadata associated with that item, which in the case of a file is the inode information, e.g. creation time, ownership, file length, and so forth.

The keys contained in a leaf page may be referred to as full keys. In an embodiment, a B+ Tree full key is a 128-bit number kept in sorted order on the page. It is accompanied by "value," which is an index to data associated with that key and may also be referred to as a "payload." In an embodiment, the 128-bit key comprises a 64-bit PID, or parent file ID (the ID of the directory that owns this item), and a 64-bit CID, or child file ID, which is exported to external references for file access.

In the example shown in FIG. 7, a full key 720 for a file has the identifier "<16:20>" and includes an offset 725 identifying a location in the page where the payload resides. More particularly, the value "16" identifies a directory in which the file resides and the value "20" identifies the actual file ID or inode number 730. As discussed, the inode includes data pointers or content handle (CH) referencing 735 content in file data storage 740.

In an embodiment, the filesystem namespace may be partitioned into multiple logical partitions. That is, the filesystem may be partitioned into separate mini-file systems with each mini-filesystem capable of being managed separately. In an embodiment, the logical partitions or mini-filesystems are referred to as managed trees (Mtrees). Mtree's are mountable portions of the filesystem and can be named by the user, while the system internally uses a unique Mtree ID (MID). Snapshots are also mountable mini-file systems but read-only. In an embodiment, each mountable mini-file system or logical partition is represented internally as a B+ Tree. In other words, both Mtrees and Mtree snapshot namespaces are represented internally as a B+ Tree.

Figure 8:
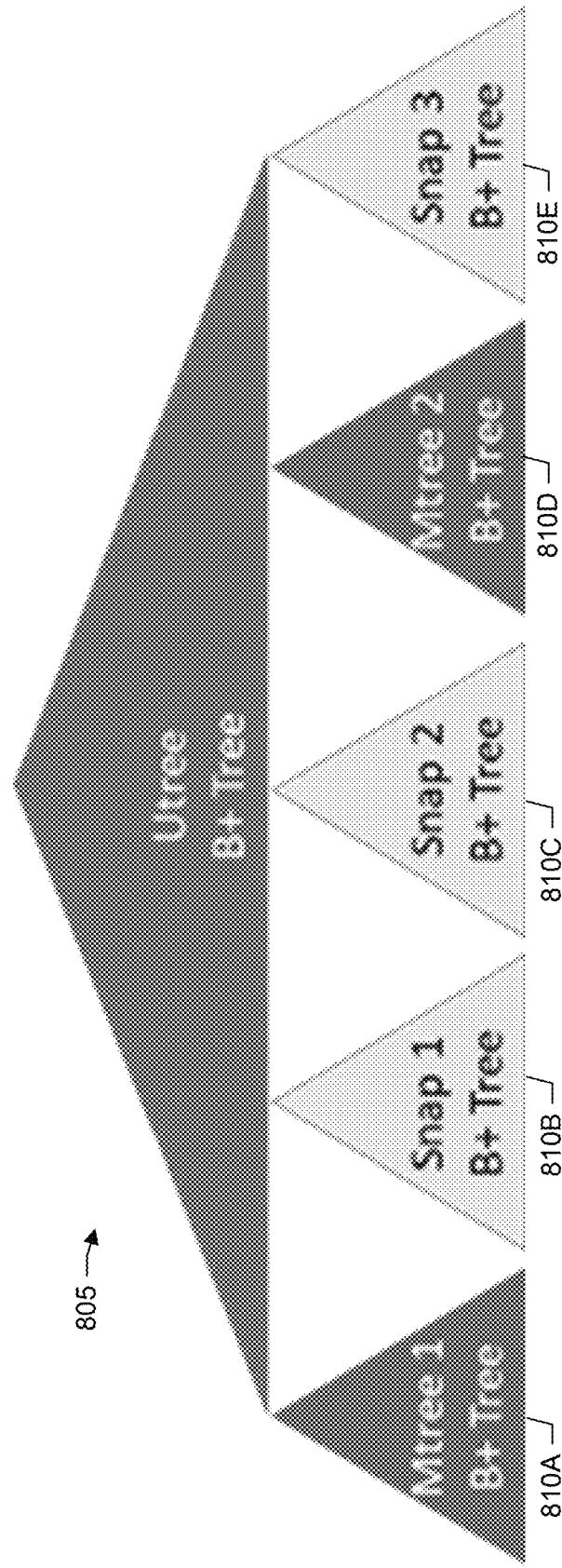
FIG. 8 shows an example of a Utree organizing logical partitions of the filesystem, according to one or more embodiments.

FIG. 8 shows an example of a tree data structure 805 being used to track multiple other tree data structures 810A-E, each of the other tree data structures corresponding to a logical partition or Mtree or snapshot of a tree. In an embodiment, tree data structure 805 is referred to as a Utree. In this embodiment, a directory manager (DM) component of the filesystem represents the namespace using B+ Trees. Mtrees and their snapshots are B+ trees, and they in turn are referenced from a parent B+ tree, the "Utree." In other words, keeping tracking of the multiple logical partitions or Mtree is accomplished using another B+ tree that may be referred to as the Utree.

Referring back now to FIG. 1, the load balancer provides a redirection layer from clients that are interacting with the data protection system. That is, the load balancer routes filesystem requests to a particular front-end for processing. The load balancer can map different file operations to different nodes for processing. Front-ends may be referred to as access objects. Front-ends are responsible for namespace operations on the tree. For example, filesystem operations including opening, closing, and renaming files and directories, creating new files and folders, moving files and files and folders, updating files and folders, writing or overwriting files and folders, and the like involve the manipulation of metadata including updates to the namespace so that file data segments are properly referenced. Thus, namespace operations handled by the front-ends may include generating and inserting segment references for new files or for new segments of an existing file; or removing segment references such as in cases of file deletions. The back-ends are responsible for handling and processing the actual file data segments themselves. Examples of such processing operations include deduplication, compression, and storage.

The key-value store provides persistent storage for the namespace B+ tree data structures of the filesystem. A key-value store is a type of data structure that stores data as a set of unique identifiers, each of which have an associated value or blob of data. This data pairing may be referred to as a "key-value pair." The unique identifier is the "key" for an item of data, and a value is either the data being identified or the location of that data. Key-value stores, as compared to traditional relational databases, can offer very fast performance for reads and writes, in part because the database is searching for a single key and is returning its associated value rather than performing complex aggregations as may be the case with relational databases.

The key-value store includes any number of tables to organize, logically group, and store the namespace metadata. In an embodiment, the key-value store includes a first table that may be referred to as a page tree table, and a second table that may be referred to as an inode table. Table A below shows an example of the page tree table.

TABLE A

| Key | Value |
|---|---|
| key (page ID) | page content |
| ... | ... |

Table B below shows an example of the inode table.

TABLE B

| Key | Value |
|---|---|
| key (inode number) | inode content |
| ... | ... |

As discussed, in an embodiment, the namespace is represented as a B+ tree where pages of the tree are written to the key-value store. Page identifiers form the keys of the key-value store and page content form the values of the key-value store. The inode table organizes the inodes associated with the files in the filesystem. The tree data structure includes the folder and file structure as well as file inodes. Thus, operations on the namespace or tree involve operations on the key-value store. For example, an insert or put operation adds a new key-value pair to the store. A get or retrieve operation retrieves the value associated with a given key. An update operation modifies the value associated with a specific key. A delete or remove operation removes a key-value pair from the store.

Figure 9:
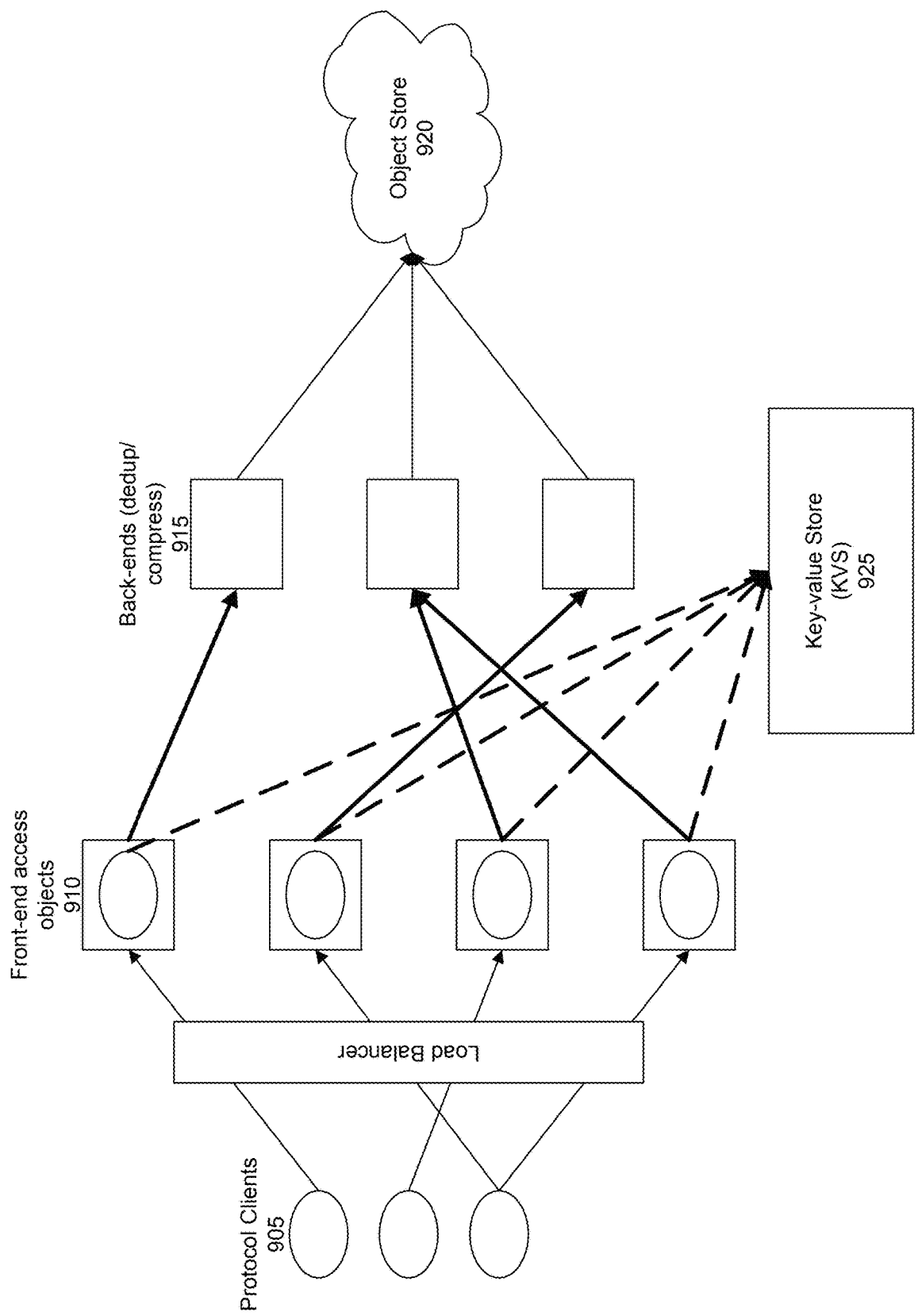
FIG. 9 shows a block diagram of a cluster filesystem, according to one or more embodiments.

FIG. 9 shows a block diagram showing operations of the filesystem in further detail. As shown in the example of FIG. 9, there are clients 905, front-end nodes or access objects 910, back-end nodes or objects 915, an object store 920, and a key-value store 925.

In an embodiment, the filesystem is a distributed filesystem that operates in a cluster of compute nodes. The filesystem distinguishes between file metadata and file data and includes snapshotting to provide a consistent point-in-time image between those objects. In an embodiment, the filesystem processes file metadata on the front-end nodes or access objects (AOBs) and file data on the back-end nodes or objects.

In FIG. 9, the flow of file data is shown using arrows with bolded lines and the flow of the metadata is shown using arrows with broken lines. The load balancer receives filesystem requests from the clients and selects which front-end node or access object should handle the request.

In an embodiment, tree (e.g., Mtree) metadata is shared across all the nodes in the cluster and hence persisted in a distributed key-value store (KVS) which is visible cluster wide. A distributed lock manager is used to assure serialized access to critical data structures. Data, and metadata, that is on the fly are written to a "durable log" which provides high-speed non-volatile services akin to non-volatile random-access memory (NVRAM) for ongoing transactions.

In an embodiment, a tree or Mtree containing shared namespace metadata can be updated by filesystem processes running on multiple nodes. Mutual exclusion can be achieved by using a distributed lock manager and locking the entire hierarchy of the metadata chain. The load balancer distributes file accesses across different nodes in the cluster. This load balancing allows concurrent operations on different file metadata residing in the Btree leaf pages.

The following are some examples of guaranteeing mutual exclusion for Btree leaf pages. A first example includes shared metadata locking of different leaf pages. Consider the following operations on two different leaf pages on a Btree as shown in Table C below.

TABLE C

- Client File operation on Dir1/File 1 –> Load Balancer –> Node 1 –> Intermediate pages –> Leaf 1
- Client File operation on Dir2/File 1 –> Load Balancer –> Node 2 –> Intermediate pages –> Leaf 2

In other words, a first operation includes a first node operating on a first leaf page. A second operation includes a second node operating on a second leaf page. In an embodiment, each node can operate on the leaf page by grabbing the exclusive lock and a shared lock on the intermediate page hierarchy. This allows concurrent operations without forcing exclusive access to both intermediate and leaf pages. Each node can operate on a different portion of the metadata by acquiring an exclusive lock on the page.

A second example includes shared metadata locking of the same leaf page. Consider the following operations on the same leaf pages on a Btree as shown in Table D below.

TABLE D

- Client File operation on Dir1/File 1 –> Load Balancer –> Node 1 –> Intermediate pages –> Leaf 1
- Client File operation on Dir2/File 1 –> Load Balancer –> Node 2 –> Intermediate pages –> Leaf 1

In other words, a first operation includes a first node operating on a first leaf page. A second operation includes a second node operating on the same first leaf page. In an embodiment, even here, each node can operate on the leaf page by grabbing the exclusive lock and a shared lock on the intermediate page hierarchy. This allows concurrent operations without forcing exclusive access to both intermediate and leaf pages.

In some cases, a filesystem operation may involve two or more leaf pages. For example, the operation may involve updating first and second full keys where the first full key is on a first leaf page and the second full key is on a second leaf page. More particularly, a third example includes shared metadata locking of a set of leaf pages (e.g., two or more leaf pages) which can lead to a deadlock problem.

Consider the following operations on two sets of leaf pages on a Btree as shown in Table E below.

TABLE E

- Client File operation on Dir1/File 1 –> Load Balancer –> Node 1 –> Intermediate pages –> Leaf 1, Leaf 2
- Client File operation on Dir2/File 1 –> Load Balancer –> Node 2 –> Intermediate pages –> Leaf 2, Leaf 1

In other words, a first operation includes a first node operating on a first leaf page, followed by a second leaf page. A second operation includes a second node operating on the second leaf page, followed by the first leaf page.

In this example, each node is operating on a set of leaf pages by grabbing the exclusive lock and a shared lock on the intermediate page hierarchy. This scenario, however, can result in a deadlock. Specifically, until the transaction is "committed" completely, transient dirty changes cannot be made visible to other readers. Consider the following operation sequences for node 1 and node 2, respectively, as shown in Table F below.

TABLE F

Node 1
- Transaction Start –> Modify Leaf 1 –> Modify Leaf 2 –> Transaction Complete
- Transaction => atomic updates of metadata
- Until the transaction is complete, leaf 1 changes cannot be made visible, i.e., leaf 1 has to be locked for the entire duration of the transaction.
Node 2
- Transaction Start –> Modify Leaf 2 –> Modify Leaf 1 –> Transaction Complete
- Until transaction is complete, leaf 2 changes cannot be made visible, i.e., leaf 2 has to be locked for the entire duration of the transaction.

Combining the node 1 and node 2 sequences can lead to a deadlock. Atomicity can be guaranteed by holding the locks across the entire window of from transaction start to transaction complete. Thus, there can be a deadlock across multiple transactions. The deadlock can be addressed by locking all the pages in the set. Specifically, in the example shown in Table F above, the locking sequence may be modified as shown in Table G below.

TABLE G

- Until the transaction is "committed" completely, transient dirty changes cannot be made visible to other readers.
Node 1
- Transaction Start –> Lock Leaf1 and TRY_LOCK(Leaf 2) –> Modify Leaf 1 –> Modify Leaf 2 –> Transaction Complete
- Until transaction is complete, leaf 1 changes cannot be made visible, i.e., leaf 1 has to be locked for the entire duration of the transaction.
Node 2
- Transaction Start –> Lock Leaf2 and TRY_LOCK(Leaf 1) –> Modify Leaf 2 –> Modify Leaf 1 –> Transaction Complete
- Until transaction is complete, leaf 2 changes cannot be made visible, i.e., leaf 2 has to be locked for the entire duration of the transaction.
- Combining the Node 1 and Node 2 sequences shows how a deadlock can be avoided.

Ignoring the cost of accumulating all the pages that need to be locked in each transaction, a drawback to the above technique includes limiting concurrent updates of the leaf pages from different nodes in the cluster by forcing the serialization of leaf updates.

Exclusive access to shared namespace metadata in a distributed multi-node cluster can be provided by using a distributed lock manager and locking the entire hierarchy of the metadata chain. Guaranteeing crash safe metadata updates may be implemented via transactions where the metadata updates are logged to a persistent replay log before making the metadata updates. On a crash, the transactions logged in the replay log cab be replayed to restore sanity to the filesystem.

In an embodiment, systems and techniques allow distributed namespace metadata updates via transactions with partial locking of the data structure by using the replay log to log undo updates. In other words, entities of the data structure (e.g., leaf pages of a tree data structure) is partially locked. Specifically, some or at most a subset of entities are locked while another subset of entities are not locked. Partial locking allows for better performance of the filesystem as compared to complete locking because other entities of the data structure are not locked and thus available for other operations. Undo logs are used to handle crashes or other abrupt terminations that may occur while an (atomic) transaction is in progress.

Atomicity refers to a property of the filesystem in which a transaction is treated as a single, indivisible unit of work. That is, either all changes made by the transaction are applied or none of them are applied. In an embodiment, systems and techniques allow for the partial locking of the data structure—thus facilitating good performance—while also guaranteeing atomicity and correctness in the event of a system crash or failure while a transaction is in progress. The filesystem is not left in an incomplete or inconsistent state.

Figure 10:
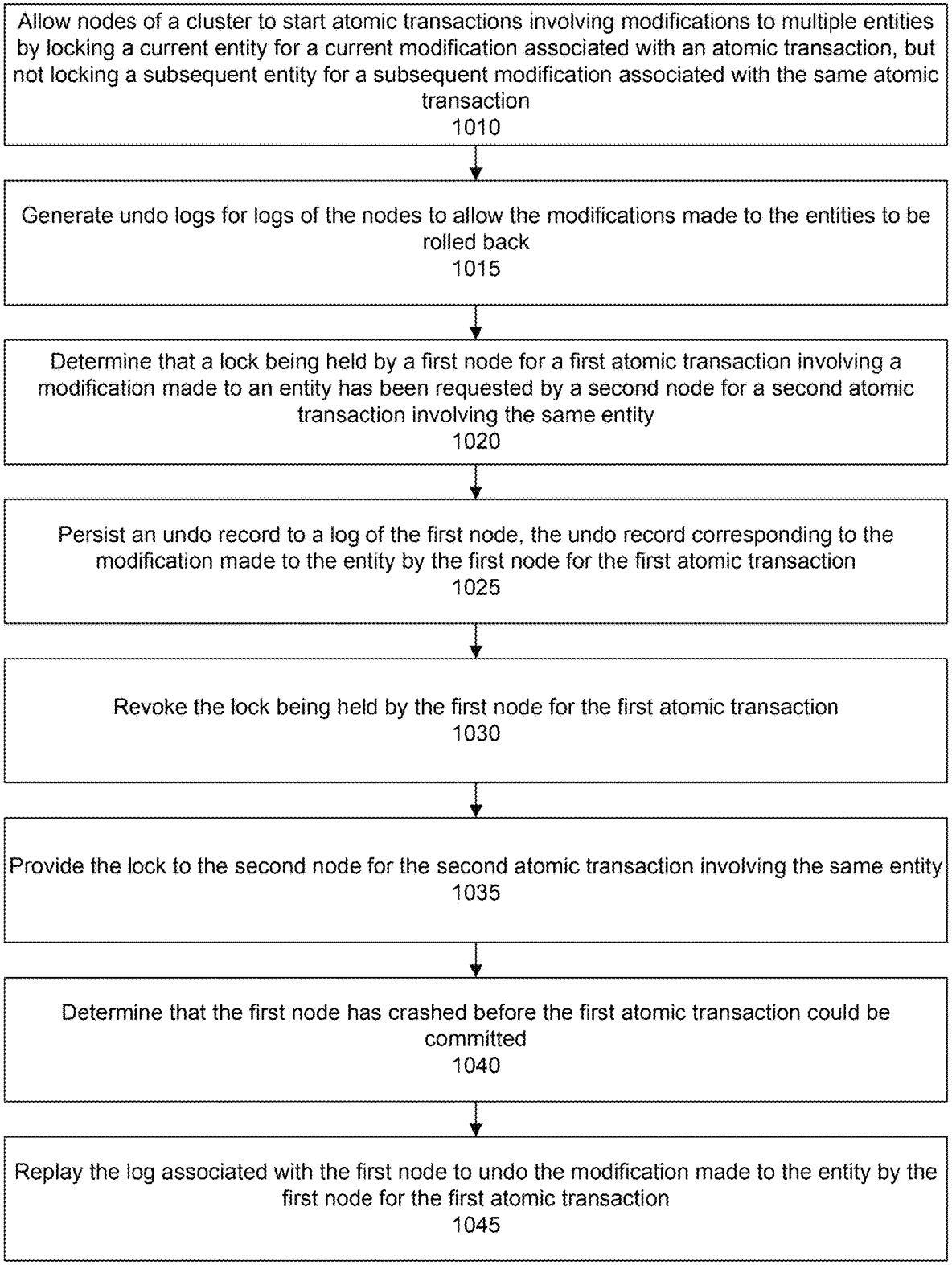
FIG. 10 shows a flow for handling distributed transactions, according to one or more embodiments.

FIG. 10 shows a flow for handling distributed transactions. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 1010, nodes of a filesystem cluster are allowed to start atomic transactions involving modifications to multiple entities of a data structure by locking a current entity for a current modification associated with an atomic transaction, but not locking a subsequent entity for a subsequent modification associated with the same atomic transaction. In an embodiment, the data structure includes a B+ tree data structure and the entities include leaf pages of the tree.

In a step 1015, undo records for logs of the nodes are generated to allow the modifications made to the entities to be rolled back.

In a step 1020, a determination is made that a lock being held by a first node for a first atomic transaction involving a modification made to an entity has been requested by a second node for a second atomic transaction involving the same entity.

In a step 1025, an undo record is persisted to a log of the first node. The undo record corresponds to the modification made to the entity by the first node for the first atomic transaction.

In a step 1030, the lock being held by the first node for the first atomic transaction is revoked. The locked is revoked before the first atomic transaction is committed.

In a step 1035, the lock is provided to the second node for the second atomic transaction involving the same entity.

In a step 1040, a determination is made that the first node has crashed before the first atomic transaction could be committed.

In a step 1045, the log associated with the first node is replayed to undo the modification made to the entity by the first node for the first atomic transaction.

Figure 11:
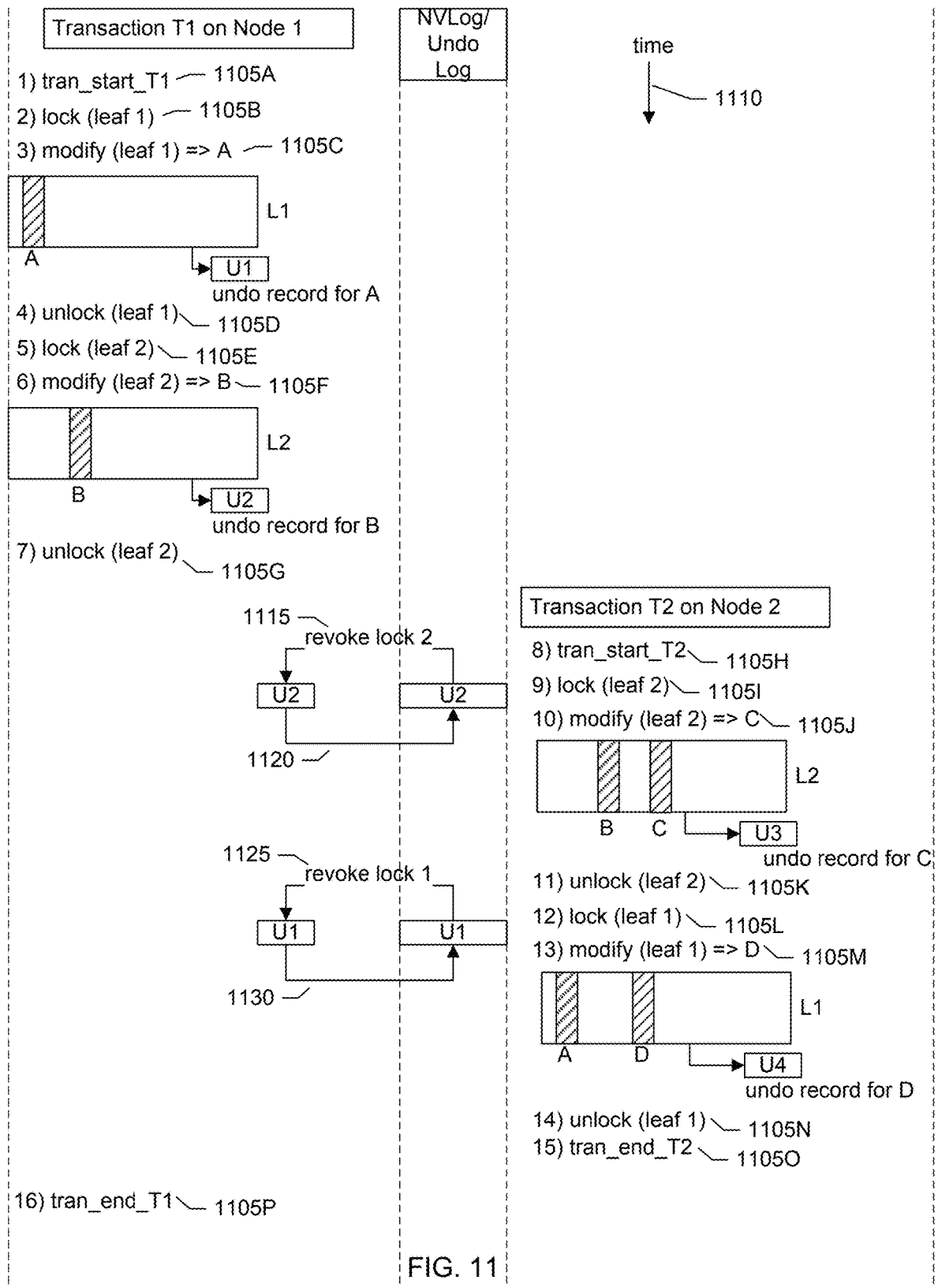
FIG. 11 shows a swimlane diagram of a workflow example for handling distributed transactions, according to one or more embodiments.

FIG. 11 shows a swimlane diagram of a workflow for allowing distributed namespace metadata updates via transactions with partial locking of the data structure and by using the replay log to log undo updates. In the example shown in FIG. 11, the data structure is a tree data structure. A first column of the swimlane shows a sequence of activity associated with a first atomic transaction T1 by a first node. A second column of the swimlane shows a sequence of activity associated with an undo log. A third column of the swimlane shows a sequence of activity associated with a second atomic transaction T2 by a second node. An arrow 1110 indicates a progression of steps 1105A-P over time.

In the example shown in FIG. 11, the first atomic transaction by the first node includes an operation on a first leaf page (L1 or leaf 1), followed by an operation on a second leaf page (L2 or leaf 2). The second atomic transaction includes an operation on the second leaf page, followed by an operation on the first leaf page.

In an embodiment, until each transaction is "committed" completely, transient dirty changes cannot be made visible to other readers (e.g., nodes). In FIG. 11, Tran_END indicates both a commit of the changes and end the respective transaction.

Table H below shows a flow of activity for the first node.

TABLE H

Node 1 (Steps 1 - 7):
- Transaction Start -> Lock Leaf1 -> Modify Leaf 1 -> Log UNDO records on Leaf 1 -> Modify Leaf 2 -> Log UNDO records on Leaf 2 ->

Table I below shows a flow of activity for the second node.

TABLE I

Node 2 (Steps 8 - 15):
- Transaction Start -> Lock Leaf2 -> Modify Leaf 2 -> Lock Leaf1 -> Modify Leaf 1 -> Transaction Complete
- Before Node 1 transaction (T1) is complete, if Node 2 wants access to the same Leaf 2, then changes from this uncommitted transaction is made visible to the entire cluster, i.e., uncommitted transaction changes to Leaf 2 are made visible. But, to save the filesystem from an inconsistency, there is a step of logging UNDO records to the replay log before the uncommitted changes are made visible.

TABLE I-continued

- The workflow of the swimlane diagram shows that combining the Node 1 and Node 2 sequences do not result in a deadlock because changes from uncommitted transactions are made visible to disk.

The workflow shown in the swimlane diagram provides for correctness on a crash. As shown in the example workflow, the Node 2 transaction is provided access to Leaf 1 and Leaf 2 with changes from Node 1 from a transaction which is not yet complete.

Consider that the Node 1 transaction does not commit its changes and dies. Changes to the metadata (from Node 1) have been made visible, but the transaction has not yet been completed or committed. Thus, there is a need to undo the changes.

This is where the undo records written to the log (U1 and U2) on Node 1 come into the picture. During a replay of the log on Node 1, the undo records are processed, and the uncommitted data is removed from the on-disk metadata and the original content before the change restored.

More particularly, consider that Node 1's uncommitted transaction changes to Leaf 1 is made visible to Node 2 (see, e.g., Step 9; 1105I).

Node 2 is operating on its own portion of Leaf 1 and will add changes to its portion in Leaf 1 (see, e.g., steps 10-11; 1105J-K).

Now, consider that Node 1 crashes after Step 7 (1105G) and before Step 16 (1105P).

When the replay log of Node 1 is processed during replay, the undo records will be processed and the uncommitted changes to Leaf 1 are undone.

In an embodiment, directory locking ensures coherence of uncommitted data. Specifically, consider step 10 (1105J). Leaf 2 has two kinds of data: Data B and Data C. Data B is uncommitted data from Node 1. Data C is data to be committed from Node 2.

Data B is not to be used by Node 2. This can be guaranteed in two ways. Correctness is guaranteed by relying on the fact that the data represented by Data B is only modified on Node 1. This is assured by the Load Balancer that maps different file operations to different nodes. With this file mapping to the nodes, the locking necessary to modify Data B will only happen on Node 1.

Further, even though Node 1's uncommitted data (Data B) is now visible to Node 2, Node 2 threads cannot modify or access Data B without Directory locking Dir 1.

Table J shows another possible sequence of the workflow shown in FIG. 11.

TABLE J

- Node 1 -> Clean Shutdown -> Data B is committed.
- Node 1 -> Dirty Shutdown -> Undo Records replayed -> Data B is de-committed.

In other words, at no point will there be exposure of uncommitted data permanently.

Consider, as another example, the following flow. In step 1 (1105A), a first atomic transaction T1 has been assigned to first node 1 by the load balancer and first node 1 starts processing the first atomic transaction. The first atomic transaction involves a modification to a first leaf page L1 1110A, followed by a subsequent modification to a second leaf page L2.

In a step 2 (1105B), first node 1 requests and acquires from the lock manager a first lock on first leaf page L1 for a current modification, but does not acquire a lock on second leaf page L2 even though the second leaf page L2 is associated with the same first atomic transaction. That is, second leaf page L2 remains unlocked while the modification is made to first leaf page L1.

In a step 3 (1105C), first node 1 makes modification A to first leaf page L1 at a first location on first leaf page L1. Modification A is accompanied by generation of an undo record U1. Undo record U1 includes information that allows modification A made by first node 1 to first leaf page L1 to be undone, reversed, or rolled back. Undo record U1 corresponding to modification A is, for the time being, maintained "in core" only, e.g., stored in the system's main volatile memory, e.g., RAM, and is not persisted to disk.

In a step 4 (1105D), modification A has been completed by first node 1 and first leaf L1 is unlocked.

In a step 5 (1105E), first node 1 requests and acquires from the lock manager a second lock on second leaf page L2 for the subsequent modification associated with the first atomic transaction T1.

In a step 6 (1105F), first node 1 makes a modification B to second leaf page L2 at a first location on second leaf page L2. Modification B is, likewise, accompanied by generation an undo record U2. Undo record U2 corresponding to modification B includes information that allows modification B made by first node 1 to second leaf page L2 to be undone, reversed, or rolled back. Undo record U2 corresponding to modification B is, for the time being, maintained "in core" only and is not persisted to disk.

In a step 7 (1105G), first node 1 has completed modification B and second leaf page L2 is unlocked.

However, before first atomic transaction T1 could be committed-step 16 (1105P)—second node 2 is allowed to start a second atomic transaction T2-step 8 (1105H).

The second atomic transaction involves a modification to second leaf page L2, followed by a subsequent modification to first leaf page L1.

Since the first atomic transaction assigned to first node 1 has not yet been committed, first node 1 still holds the first lock on first leaf page L1 and the second lock on second leaf page L2. When second node 2 requests the second lock on second leaf page L2 from the lock manager, the lock manger revokes 1115 the second lock from first node 1 and provides the second lock to second node 2. The revocation of the second lock from first node 1 triggers persisting 1120 of undo record U2 corresponding to modification B made by first node 1 on the second leaf page L2 to an undo log associated with first node 1. In other words, the undo record is stored in core only for the page and is only persisted when the lock on the page is revoked.

In a step 9 (1105I), second node 2 now has the lock on second leaf page L2. As shown in the example of FIG. 11, second leaf page L2 with modification B has been made visible to second node 2 handling second atomic transaction T2 even though first atomic transaction T1 (and thus modification B) is in an intermediate or transient state and not yet committed. Second leaf page L2 is allowed to be modified by second node 2 even though first atomic transaction T1 is not complete. In other words, first and second nodes are modifying concurrently.

In a step 10 (1105J), second node 2 makes a modification C to second leaf page L2 at a second location on second leaf page L2. The second location on second leaf page L2 associated with modification C is different from the first location on second leaf page L2 associated with modification B. Modification C is accompanied by generation of an undo record U3. Undo record U3 corresponding to modification C includes information that allows modification C made by second node 2 to second leaf page L2 to be undone, reversed, or rolled back. Undo record U3 corresponding to modification C is, for the time being, maintained "in core" only, e.g., stored in the system's main volatile memory, e.g., RAM, and is not persisted to disk.

In a step 11 (1105K), second node 2 has completed modification C and second leaf page L2 is unlocked.

In a step 12 (1105L), second node 2 begins the subsequent modification to first leaf page L1 and requests the first lock for first leaf page L1. When second node 2 requests the first lock for first leaf page L1 from the lock manager, the lock manager revokes 1125 the first lock from first node 1 and provides the first lock to second node 2. The revocation of the first lock from first node 1 triggers persisting 1130 of undo record U1 corresponding to modification A made by first node 1 on the first leaf page to the undo log associated with first node 1. As discussed, the undo record is stored in core only for the page and is only persisted when the lock on the page is revoked.

As shown in the example of FIG. 11, first leaf page L1 with modification A has been made visible to second node 2 handling second atomic transaction T2 even though first atomic transaction T1 (and thus modification A) is in an intermediate or transient state and not yet committed. First leaf page L1 is allowed to be modified by second node 2 even though first atomic transaction T1 is not complete. In other words, first and second nodes are modifying concurrently. Shared metadata is allowed to be modified by two different nodes.

In a step 13 (1105M), second node 2 makes a modification D to first leaf page L1 at a second location on first leaf page L1. The second location on first leaf page L1 associated with modification D is different from the first location on first leaf page L1 associated with modification A. Modification D is accompanied by generation of an undo record U4. Undo record U4 corresponding to modification D includes information that allows modification D made by second node 2 to first leaf page L1 to be undone, reversed, or rolled back. Undo record U4 corresponding to modification D is, for the time being, maintained "in core" only, e.g., stored in the system's main volatile memory, e.g., RAM, and is not persisted to disk.

In a step 14 (1105N), second node 2 has completed modification D and first leaf page L1 is unlocked.

In a step 15 (11050), the second atomic transaction T2 ends and is committed to disk.

In a step 16 (1105P), the first atomic transaction T1 ends and is committed to disk.

The flow above shows a success case where first node 1 successfully committed first atomic transaction T1; and second node 2 successfully committed second atomic transaction T2. Thus, replays of the undo logs were not required.

Consider, however, a scenario where a node such as first node 1 crashes while first atomic transaction T1 is in progress and after second node 2 has started second atomic transaction T2 involving the same leaf pages as first atomic transaction T1. In other words, first leaf page L1 containing modification A, second leaf page L2 containing modification B, or both have been provided to second node 2 despite first leaf page L1 and second leaf page L2 having data that is uncommitted. First node 1 has crashed before the first atomic transaction could be committed at step 16 (1105P).

In this case, the undo log associated with first node 1 can be replayed to remove the modifications made by first node 1 and restore the original content. Specifically, consider that first node 1 crashes after first and second leaf pages containing modification A and B, respectively, have been provided to second node 2 (e.g., first node crashes at step 12 (1105L)). The undo log—containing second undo record U2 corresponding to modification B made by first node 1 to second leaf page L2 and first undo record U1 corresponding to modification A made by first node 1 to first leaf page L1—can be replayed to restore second leaf page L2 to a state before modification B; and restore first leaf page L1 to a state before modification A.

As another example, consider that first node 1 crashes after second leaf page L2 has been provided to second node 2, but before first leaf page L1 has been provided to second node 2. For example, first node 1 crashes during step 10 (1105J) while second node 2 is making modification C to second leaf page L2. In this case, the undo log will not contain undo record U1 for first leaf page L1 since first leaf page L1 (containing modification A) has not yet been provided to second node 2. Second node 2 has not been provided with uncommitted data. Thus, replaying the undo log having undo record U2 for second leaf page L2 (and not having undo record U1 for first leaf page L1) is sufficient to restore the original state. An undo record is written to a log only if the corresponding metadata's lock is revoked during a transaction. The undo record is replayed only if the corresponding transaction was unable to complete.

The described systems and techniques allow distributed namespace metadata updates (from different nodes in the cluster) with partial locking of the namespace hierarchy. This is may be performed by using transactions with a replay log as an accomplice. Partial locking of the namespace hierarchy means not having to freeze the entire metadata hierarchy and thus not having to serialize transactions across nodes in the cluster. As a result performance is greatly increased. Specifically, allowing more concurrency in a distributed cluster has a large performance improvement in a shared metadata architecture.

Using undo records along with partial locking to gain improved concurrency is a unique feature. The cost of logging the undo records is relatively small and is offset by the gain in concurrency.

As discussed, in an embodiment, partial locking of the namespace hierarchy with replay (or undo) logs is provided in a filesystem using a B+ Tree data structure. However, the problem of serializing transactions across the nodes exists in other filesystems too that do not use B+ Tree implementations. For example, in some other filesystems, each directory metadata is stored in a (block based) buffer cache (ext4 for example). Ext4 or the fourth extended filesystem is a type of filesystem used in Linux-based operating systems. This mechanism can be used even in non-Btree based implementations.

One of skill in the art would understand that the described systems and techniques for handling distributed transactions involving updates to multiple entities or pieces of metadata can be applied to many different types of data structures. Some examples of such data structures include linear data structures, non-linear data structures, hierarchical data structures, non-hierarchical data structures, trees, graphs, arrays, queues, stacks, and linked lists, among others. Depending on the particular data structure used, an entity of a data structure may be referred to as a leaf, page, block, node, element, or child-just to name a few examples. For example, in a block-based buffer cache involving updates to multiple blocks, the described systems and techniques allow for partial locking of the blocks. When a transaction involves updates to multiple entities of a data structure, the described systems and techniques provide for a partial locking of the data structure (e.g., locking at most a subset of the entities) rather than the entire data structure, thereby improving concurrency and performance. Replay or undo logs help guarantee correctness on a crash or other interruption while a transaction is in progress.

Correctness guarantees despite partial locking is ensured. For example, correctness on a crash is provided by the replay log and logging of undo records. Any uncommitted data from a transaction is cleaned out on a crash. In other words, the system does not allow uncommitted data to persist on a clean and complete file system.

The described systems and techniques further provide correctness during active execution. For example, referring back now to FIG. 11, even though uncommitted data from first node 1 is exposed to exposed to second node 2, systems and techniques guarantee that the uncommitted data is not used by second node 2. This is accomplished by enforcing the invariant that first node 1 uncommitted data is never modified by any other node except first node 1 via the load balancer. For example, in an embodiment, the load balancer maintains a table that maps ranges of files (via hashes of file handles) to front-end nodes. The file assignment mappings allow the load balancer to assign and direct various filesystem requests to particular front-ends on a consistent basis. As an example, consider a request to write to a file. The load balancer reviews the table of file assignment mappings to identify a particular front-end that is responsible for the file (based on a hash of the file handle) and directs the request to the particular front-end. Subsequently, if there is an on-going operation or other immediate request involving the file, such as a read of the file, the load balancer again reviews the file assignment mappings and directs the subsequent request to the same particular front-end to process the subsequent request.

Referring back now to FIG. 1, the clients may include servers, desktop computers, laptops, tablets, smartphones, internet of things (IoT) devices, or combinations of these. The data protection backup storage system receives requests from the clients, performs processing required to satisfy the requests, and forwards the results corresponding to the requests back to the requesting client system. The processing required to satisfy the request may be performed by the data protection storage appliance or may alternatively be delegated to other servers connected to the network.

The network may be a cloud network, local area network (LAN), wide area network (WAN) or other appropriate network. The network provides connectivity to the various systems, components, and resources of the system, and may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The storage system connected to the data protection server may include storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays, shared storage pool, or an object or cloud storage service. In an embodiment, storage (e.g., tape or disk array) may represent any practical storage device or set of devices, such as tape libraries, virtual tape libraries (VTL), fiber-channel (FC) storage area network devices, and OST (OpenStorage) devices. The storage may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks. Thus, storage may represent logical storage that includes any number of physical storage devices connected to form a logical storage.

Components of the data protection system may be implemented using a microservices architecture. For example, the load balancer, front-ends, and back-ends may be implemented as microservices running in a set of containers and managed by a container orchestration service. An example of a container orchestration service is Kubernetes. Kubernetes is an open-source container-orchestration system for automating computer application deployment, scaling, and management.

In an embodiment, there is a method including: allowing nodes of a cluster to start atomic transactions involving modifications to multiple entities of a data structure by locking a current entity for a current modification associated with an atomic transaction, but not locking a subsequent entity for a subsequent modification associated with the same atomic transaction; generating undo records for logs of the nodes to allow the modifications made to the entities to be rolled back; when a lock being held by a first node for a first atomic transaction involving a modification made to an entity is requested by a second node for a second atomic transaction involving the same entity, persisting an undo record to a log of the first node, the undo record corresponding to the modification made to the entity by the first node for the first atomic transaction; revoking the lock being held by the first node for the first atomic transaction; and providing the lock to the second node; and upon a determination that the first node has crashed before the first atomic transaction could be committed, replaying the log associated with the first node to undo the modification made to the entity by the first node for the first atomic transaction.

In an embodiment, the data structure comprises a B+ tree data structure and the entities comprise leaf pages of the B+ tree data structure. In an embodiment, the undo record for the modification made to the entity by the first node is not persisted to the log until the second node makes the request for the lock being held by the first node. In an embodiment, the first atomic transaction involves another modification to be made to another entity of the data structure, and the method further comprises: not locking the other entity while the modification is being made to the entity.

In an embodiment, a directory lock associated with the entity prevents the second node from accessing the modification made to the entity by the first node. In an embodiment, each atomic transaction involves modifications to two or more entities of the data structure. In an embodiment, the undo record for the modification made to the entity by the first node is maintained in memory and persisted to the log only when the second node makes the request for the lock being held by the first node.

In another embodiment, there is a system comprising: a processor; and memory configured to store one or more sequences of instructions which, when executed by the processor, cause the processor to carry out the steps of: allowing nodes of a cluster to start atomic transactions involving modifications to multiple entities of a data structure by locking a current entity for a current modification associated with an atomic transaction, but not locking a subsequent entity for a subsequent modification associated with the same atomic transaction; generating undo records for logs of the nodes to allow the modifications made to the entities to be rolled back; when a lock being held by a first node for a first atomic transaction involving a modification made to an entity is requested by a second node for a second atomic transaction involving the same entity, persisting an undo record to a log of the first node, the undo record corresponding to the modification made to the entity by the first node for the first atomic transaction; revoking the lock being held by the first node for the first atomic transaction; and providing the lock to the second node; and upon a determination that the first node has crashed before the first atomic transaction could be committed, replaying the log associated with the first node to undo the modification made to the entity by the first node for the first atomic transaction.

In another embodiment, there is a computer program product, comprising a non-transitory computer-readable medium having a computer-readable program code embodied therein, the computer-readable program code adapted to be executed by one or more processors to implement a method comprising: allowing nodes of a cluster to start atomic transactions involving modifications to multiple entities of a data structure by locking a current entity for a current modification associated with an atomic transaction, but not locking a subsequent entity for a subsequent modification associated with the same atomic transaction; generating undo records for logs of the nodes to allow the modifications made to the entities to be rolled back; when a lock being held by a first node for a first atomic transaction involving a modification made to an entity is requested by a second node for a second atomic transaction involving the same entity, persisting an undo record to a log of the first node, the undo record corresponding to the modification made to the entity by the first node for the first atomic transaction; revoking the lock being held by the first node for the first atomic transaction; and providing the lock to the second node; and upon a determination that the first node has crashed before the first atomic transaction could be committed, replaying the log associated with the first node to undo the modification made to the entity by the first node for the first atomic transaction.

In another embodiment, there is a method comprising: allowing nodes of a cluster to start atomic transactions involving modifications to multiple leaf pages by locking a current leaf page for a current modification associated with an atomic transaction, but not locking a subsequent leaf page for a subsequent modification associated with the same atomic transaction; generating undo records for logs of the nodes to allow the modifications made to the leaf pages to be rolled back; when a lock being held by a first node for a first atomic transaction involving a modification made to a leaf page is requested by a second node for a second atomic transaction involving the same leaf page, persisting an undo record to a log of the first node, the undo record corresponding to the modification made to the leaf page by the first node for the first atomic transaction; revoking the lock being held by the first node for the first atomic transaction; and providing the lock to the second node; and upon a determination that the first node has crashed before the first atomic transaction could be committed, replaying the log associated with the first node to undo the modification made to the leaf page by the first node for the first atomic transaction.

Figure 12:
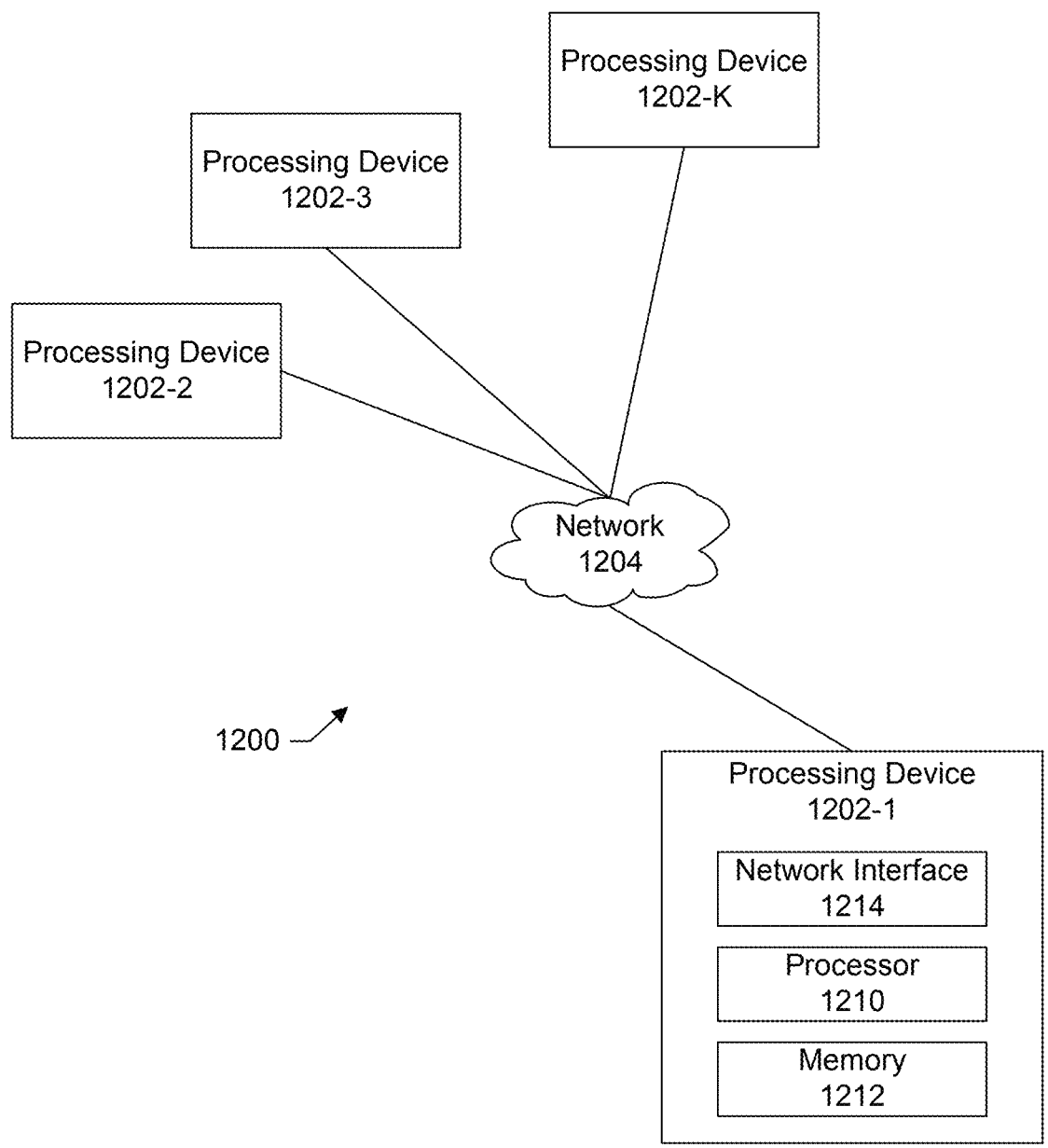
FIG. 12 shows a block diagram of a processing platform that may be utilized to implement at least a portion of an information processing system, according to one or more embodiments.

FIG. 12 shows an example of a processing platform 1200 that may include at least a portion of the information handling system shown in FIG. 1. The example shown in FIG. 12 includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA) or other type of processing circuitry, as well as portions or combinations of such circuitry elements.

The memory 1212 may comprise random access memory (RAM), read-only memory (ROM) or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and the information handling system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 13:
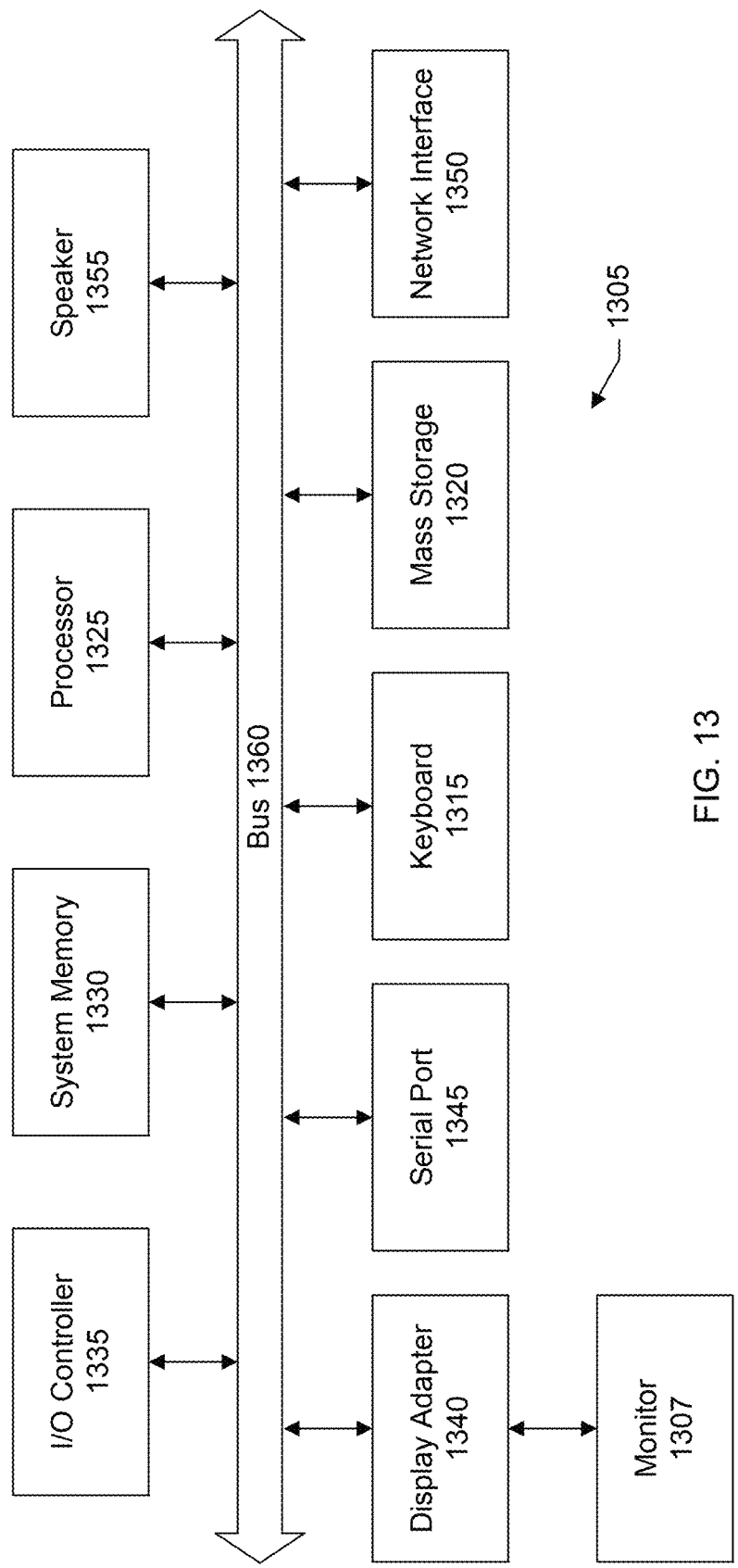
FIG. 13 shows a block diagram of a computer system suitable for use with the system, according to one or more embodiments.

FIG. 13 shows a system block diagram of a computer system 1305 used to execute the software of the present system described herein. The computer system includes a monitor 1307, keyboard 1315, and mass storage devices 1320. Computer system 1305 further includes subsystems such as central processor 1325, system memory 1330, input/output (I/O) controller 1335, display adapter 1340, serial or universal serial bus (USB) port 1345, network interface 1350, and speaker 1355. The system may also be used with computer systems with additional or fewer subsystems. For example, a computer system could include more than one processor 1325 (i.e., a multiprocessor system) or a system may include a cache memory.

Arrows such as 1360 represent the system bus architecture of computer system 1305. However, these arrows are illustrative of any interconnection scheme serving to link the subsystems. For example, speaker 1355 could be connected to the other subsystems through a port or have an internal direct connection to central processor 1325. The processor may include multiple processors or a multicore processor, which may permit parallel processing of information. Computer system 1305 shown in FIG. 13 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11 g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:
1. A method comprising:
allowing a first node of a cluster to start a first atomic transaction involving modifications to a first entity and a second entity of a data structure by locking the first entity for a first modification associated with a first atomic transaction, but not locking the second entity for a second modification associated with first atomic transaction;

generating, at the first node, a first undo record for the first modification to allow the first modification made to the first entity to be rolled back, the first undo record being maintained in memory only at the first node and not persisted;

after the first modification to the first entity has been made by the first node, unlocking the first entity and locking the second entity for the second modification;

generating, at the first node, a second undo record for the second modification to allow the second modification made to the second entity to be rolled back, the second undo record being maintained in memory only at the first node and not persisted;

before the first atomic transaction is committed and when a lock being held by the first node for the first atomic transaction involving the second modification made to the second entity is requested by a second node for a second atomic transaction involving the second entity, triggering a persisting of the second undo record to a log of the first node, the second undo record corresponding to the second modification made to the second entity by the first node for the first atomic transaction and the second undo record now being persisted;

revoking the lock on the second entity being held by the first node for the first atomic transaction; and providing the lock to the second node;

upon a determination that the first node has crashed before the first atomic transaction could be committed, replaying the log having the second undo record and associated with the first node to undo the second modification made to the second entity by the first node for the first atomic transaction; and before the first atomic transaction is committed, exposing, to the second node, the first entity comprising the first modification made by the first node.

2. The method of claim 1 wherein the data structure comprises a B+ tree data structure and the entities comprise leaf pages of the B+ tree data structure.

3. The method of claim 1 wherein the second undo record for the second modification made to the second entity by the first node is not persisted to the log until the second node makes the request for the lock being held by the first node.

4. The method of claim 1 wherein a directory lock associated with the second entity prevents the second node from accessing the second modification made to the second entity by the first node.

5. The method of claim 1 wherein each atomic transaction involves modifications to two or more entities of the data structure.

6. The method of claim 1 wherein the first and second nodes of the cluster host a distributed filesystem, the data structure comprises a tree data structure holding a namespace of the filesystem, and the first and second entities comprise leaf pages of the tree data structure.

7. A system comprising: a processor; and memory configured to store one or more sequences of instructions which, when executed by the processor, cause the processor to carry out the steps of:

allowing a first node of a cluster to start a first atomic transaction involving modifications to a first entity and a second entity of a data structure by locking the first entity for a first modification associated with a first atomic transaction, but not locking the second entity for a second modification associated with first atomic transaction;

generating, at the first node, a first undo record for the first modification to allow the first modification made to the first entity to be rolled back, the first undo record being maintained in memory only at the first node and not persisted;

after the first modification to the first entity has been made by the first node, unlocking the first entity and locking the second entity for the second modification;

generating, at the first node, a second undo record for the second modification to allow the second modification made to the second entity to be rolled back, the second undo record being maintained in memory only at the first node and not persisted;

before the first atomic transaction is committed and when a lock being held by the first node for the first atomic transaction involving the second modification made to the second entity is requested by a second node for a second atomic transaction involving the second entity, triggering a persisting of the second undo record to a log of the first node, the second undo record corresponding to the second modification made to the second entity by the first node for the first atomic transaction and the second undo record now being persisted;

revoking the lock on the second entity being held by the first node for the first atomic transaction; and providing the lock to the second node;

upon a determination that the first node has crashed before the first atomic transaction could be committed, replaying the log having the second undo record and associated with the first node to undo the second modification made to the second entity by the first node for the first atomic transaction; and before the first atomic transaction is committed, exposing, to the second node, the first entity comprising the first modification made by the first node.

8. The system of claim 7 wherein the data structure comprises a B+ tree data structure and the entities comprise leaf pages of the B+ tree data structure.

9. The system of claim 7 wherein the second undo record for the second modification made to the second entity by the first node is not persisted to the log until the second node makes the request for the lock being held by the first node.

10. The system of claim 7 wherein a directory lock associated with the second entity prevents the second node from accessing the second modification made to the second entity by the first node.

11. The system of claim 7 wherein each atomic transaction involves modifications to two or more entities of the data structure.

12. A computer program product, comprising a non-transitory computer-readable medium having a computer-readable program code embodied therein, the computer-readable program code adapted to be executed by one or more processors to implement a method comprising:

allowing a first node of a cluster to start a first atomic transaction involving modifications to a first entity and a second entity of a data structure by locking the first entity for a first modification associated with a first atomic transaction, but not locking the second entity for a second modification associated with first atomic transaction;

generating, at the first node, a first undo record for the first modification to allow the first modification made to the first entity to be rolled back, the first undo record being maintained in memory only at the first node and not persisted;

after the first modification to the first entity has been made by the first node, unlocking the first entity and locking the second entity for the second modification;

generating, at the first node, a second undo record for the second modification to allow the second modification made to the second entity to be rolled back, the second undo record being maintained in memory only at the first node and not persisted;

before the first atomic transaction is committed and when a lock being held by the first node for the first atomic transaction involving the second modification made to the second entity is requested by a second node for a second atomic transaction involving the second entity, triggering a persisting of the second undo record to a log of the first node, the second undo record corresponding to the second modification made to the second entity by the first node for the first atomic transaction and the second undo record now being persisted;

revoking the lock on the second entity being held by the first node for the first atomic transaction; and providing the lock to the second node;

upon a determination that the first node has crashed before the first atomic transaction could be committed, replaying the log having the second undo record and associated with the first node to undo the second modification made to the second entity by the first node for the first atomic transaction; and before the first atomic transaction is committed, exposing, to the second node, the first entity comprising the first modification made by the first node.

13. The computer program product of claim 12 wherein the data structure comprises a B+ tree data structure and the entities comprise leaf pages of the B+ tree data structure.

14. The computer program product of claim 12 wherein the second undo record for the second modification made to the second entity by the first node is not persisted to the log until the second node makes the request for the lock being held by the first node.

15. The computer program product of claim 12 wherein a directory lock associated with the second entity prevents the second node from accessing the second modification made to the second entity by the first node.

16. The computer program product of claim 12 wherein each atomic transaction involves modifications to two or more entities of the data structure.

* * * * *